(12) United States Patent
Zeng et al.

(10) Patent No.: US 11,669,937 B2
(45) Date of Patent: Jun. 6, 2023

(54) METHOD AND SYSTEM FOR ENHANCING IMAGE CAPTURED BY ON-BOARD CAMERA, AND COMPUTING DEVICE

(71) Applicant: Huajie Zeng, Ningbo (CN)

(72) Inventors: Huajie Zeng, Ningbo (CN); Yixiang Fang, Ningbo (CN)

(73) Assignee: Huajie Zeng, Ningbo (CN)

( * ) Notice: Subject to any disclaimer, the term of this patent is extended or adjusted under 35 U.S.C. 154(b) by 0 days.

(21) Appl. No.: 17/830,975

(22) Filed: Jun. 2, 2022

(65) Prior Publication Data
US 2022/0301107 A1    Sep. 22, 2022

Related U.S. Application Data

(63) Continuation of application No. PCT/CN2022/079268, filed on Mar. 4, 2022.

(51) Int. Cl.
| | | |
|---|---|---|
| *H04N 7/18* | (2006.01) | |
| *G06T 5/00* | (2006.01) | |
| *G06T 5/50* | (2006.01) | |
| *G06T 7/00* | (2017.01) | |
| *B60S 1/54* | (2006.01) | |
| *H04N 23/52* | (2023.01) | |

(52) U.S. Cl.
CPC ............... *G06T 5/001* (2013.01); *B60S 1/54* (2013.01); *G06T 5/50* (2013.01); *G06T 7/0002* (2013.01); *H04N 23/52* (2023.01); *G06T 2207/20081* (2013.01); *G06T 2207/20084* (2013.01); *G06T 2207/30168* (2013.01); *G06T 2207/30252* (2013.01)

(58) Field of Classification Search
CPC ......... G06T 5/001; G06T 5/50; G06T 7/0002; G06T 2207/20081; G06T 2207/20084; G06T 2207/30168; G06T 2207/30252; H04N 23/52; H04N 7/18; H04N 5/225; B60S 1/54
USPC ........................................................ 348/148
See application file for complete search history.

(56) References Cited

U.S. PATENT DOCUMENTS

| | | | | |
|---|---|---|---|---|
| 10,597,002 | B1* | 3/2020 | Baldovino | ......... B60H 1/00735 |
| 10,720,058 | B2* | 7/2020 | Ding | ...................... G08G 1/168 |
| 11,042,968 | B2* | 6/2021 | Xu | ........................... G06F 18/22 |
| 11,250,329 | B2* | 2/2022 | Karras | ................... G06N 3/045 |
| 2018/0315167 | A1* | 11/2018 | Akiyama | ............... H04N 23/61 |

(Continued)

FOREIGN PATENT DOCUMENTS

| | | |
|---|---|---|
| CN | 103986861 A | 8/2014 |
| CN | 103999220 A | 8/2014 |

(Continued)

*Primary Examiner* — Trang U Tran

(57) ABSTRACT

Disclosed are a method and a system for enhancing an image captured by an on-board camera, and a computing device. The method includes: acquiring a plurality of first original image captured by a camera of the sampling vehicle; when a discriminative model in a generative adversarial networks (GAN) model determines that a quality of an output image of a generative model is poorer than an expected quality, training the generative model by using the first original images to obtain an image enhancement model; and enhancing a second original image captured by an on-board camera of a running vehicle by using the image enhancement model to acquire an enhanced image.

15 Claims, 10 Drawing Sheets

(56) References Cited

U.S. PATENT DOCUMENTS

| | | | |
|---|---|---|---|
| 2019/0313001 A1 | 10/2019 | Kawashima et al. | |
| 2020/0050879 A1 | 2/2020 | Zaman et al. | |
| 2020/0304618 A1 | 9/2020 | Seo et al. | |
| 2021/0133501 A1* | 5/2021 | Xu | G06T 11/60 |

FOREIGN PATENT DOCUMENTS

| | | |
|---|---|---|
| CN | 203933790 U | 11/2014 |
| CN | 204089956 U | 1/2015 |
| CN | 106740708 A | 5/2017 |
| CN | 107278277 A | 10/2017 |
| CN | 107798306 A | 3/2018 |
| CN | 108508686 A | 9/2018 |
| CN | 110120024 A | 8/2019 |
| CN | 110223259 A | 9/2019 |
| CN | 110570358 A | 12/2019 |
| CN | 209913924 U | 1/2020 |
| CN | 110944102 A | 3/2020 |
| CN | 210274240 U | 4/2020 |
| CN | 211557356 U | 9/2020 |
| CN | 112601000 A | 4/2021 |
| CN | 213162067 U | 5/2021 |
| CN | 214228326 U | 9/2021 |
| CN | 113824887 A | 12/2021 |
| CN | 215453093 U | 1/2022 |
| CN | 114037053 A | 2/2022 |
| JP | 2013106180 A | 5/2013 |
| WO | 2009135539 A1 | 11/2009 |
| WO | 2018045751 A1 | 3/2018 |

\* cited by examiner

Acquiring a plurality of first original images captured by a camera 20 of a sampling vehicle

When a discriminative model in a generative adversarial networks (GAN) model determines that a quality of an output image of a generative model is lower than an expected quality, training the generative model to obtain an image enhancement model by using the first original images

Enhancing a second original image captured by a camera of a running vehicle by using the image enhancement model to acquire an enhanced image

FIG. 2

METHOD AND SYSTEM FOR ENHANCING IMAGE CAPTURED BY ON-BOARD CAMERA, AND COMPUTING DEVICE

CROSS-REFERENCE TO RELATED APPLICATIONS

This application is a continuation of International Patent Application No. PCT/CN2022/079268, filed on Mar. 4, 2022, which claims the benefit of priority from Chinese Patent Application No. 202210183530.9, filed on Feb. 28, 2022. The content of the aforementioned application, including any intervening amendments thereto, is incorporated herein by reference in its entirety.

TECHNICAL FIELD

This application relates to image processing, and more particularly to a method and a system for enhancing an image captured by an on-board camera, and a computing device.

BACKGROUND

Nowadays, many vehicles are equipped with a surround-view camera system, which includes a front camera, a rear camera, and two sides cameras. These cameras can respectively capture images from different directions of the vehicle. Subsequently, these images captured from the different directions are integrated by the software to form a surrounding image such that the state of the surrounding environment of the vehicle can be obtained.

The surround-view camera system is the basis for the automatic driving of vehicles. For example, automatic driving can be achieved by only images captured by the surround-view camera system, or by combining the images captured by the surround-view camera system and the detection results of radar. In other words, the automatic driving of the vehicle is realized based on the images captured by each camera of the surround-view camera system, and thus harsh requirements for the image quality of each camera of the surround-view camera system are put forward to achieve the reliable and safe automatic driving. Unfortunately, the image quality of the onboard camera is not only related to the parameters of the camera, but also closely related to the driving environment of the vehicle. For example, when the vehicle is driving under poor-lighting conditions, such as at night, on rainy and foggy days, the quality of images captured by the camera decreases and thus affecting the reliability and safety of automatic driving. Therefore, it is a challenging technical problem to enhance the image quality of the onboard camera to achieve the reliability and safety of automatic driving of the vehicle.

SUMMARY

An object of the present disclosure is to provide a method and a system for enhancing an image captured by an onboard camera, and a computing device. The method provided herein can improve the quality of the image captured by the onboard camera, and thus achieve automatic driving of the vehicle and guarantee the safety of driving.

In the method provided herein, the generative model in the generative adversarial networks (GAN) model is trained by using a plurality of images captured by the camera of the vehicle to obtain an image enhancement model. In this way, the image enhancement model is used to enhance the image captured by the camera of the running vehicle to improve the image quality to achieve automatic driving. For instance, in an embodiment, the generative model in the generative adversarial networks (GAN) model is trained by using a plurality of images captured by cameras of vehicles such that the images enhanced by the image enhancement model have higher quality.

In the method provided herein, the quality of the image captured by the camera can be improved by cleaning the lens surface of the camera of the running vehicle. For example, in the method provided herein, the dust, fog, and water droplets attached to the lens surface of the camera of the running vehicle can be removed to improve the image quality of the camera.

In the system provided herein, the camera of the running vehicle is integrated, which includes a camera device and a cleaning device. On the one hand, the cleaning device can not only clean the dust, fog, and water droplets attached to the lens surface of the camera device, on the other hand, by integrating the cleaning device and the camera device, the response speed of the cleaning device can be improved, so as to timely clean the lens surface of the camera device, which is particularly effective for the automatic driving or safe driving of the high-speed driving vehicle.

Technical solutions of the present disclosure are described as follows.

In a first aspect, the present disclosure provides a method for enhancing an image captured by an on-board camera, comprising:

(a) acquiring a plurality of first original images captured by an on-board camera of a sampling vehicle;

(b) when a discriminative model in a generative adversarial networks (GAN) model determines that a quality of an output image of a generative model is lower than an expected quality, training the generative model by using the plurality of first original images to obtain an image enhancement model; and (c) enhancing, by using the image enhancement model, a second original image captured by an on-board camera of a running vehicle to acquire an enhanced image.

In an embodiment, in step (b), when a distortion of the output image of the generative model relative to the plurality of first original images is determined by the discriminative model to be greater than a threshold, the generative model is trained by using the plurality of the first original images.

In an embodiment, step (b) further comprises:

(b.1) restoring the output image through deconvolution to obtain a restored image;

(b.2) comparing the restored image with the plurality of first original images to determine a semantic similarity between the restored image and the plurality of first original images; and (b.3) according to the semantic similarity between the restored image and the first original image, determining a distortion of the output image relative to the plurality of first original images.

In an embodiment, the running vehicle in step (c) is the sampling vehicle in step (a).

In an embodiment, the running vehicle in step (c) is different from the sampling vehicle in step (a).

In an embodiment, in step (a), when the running vehicle travels near to the sampling vehicle, a communication link between the running vehicle and the sampling vehicle is created to allow the running vehicle to acquire the plurality of first original images from the sampling vehicle.

In an embodiment, the plurality of first original images are captured by the sampling vehicle under a poor-lighting condition; and the second original image is captured by the running vehicle during running.

In an embodiment, step (c) further comprises:
determining a quality of the second original image; and
when the quality of the second original image is lower than the expected quality, cleaning a surface of the on-board camera of the running vehicle.

In an embodiment, the step of the surface of the on-board camera of the running vehicle is cleaned by air blowing from top to bottom.

In a second aspect, the present disclosure provides an image enhancement system, comprising:
an acquisition unit;
a training unit; and
an enhancement unit;
wherein the acquisition unit is configured to acquire a plurality of first original images captured by an on-board camera of a sampling vehicle and a second original image captured by an on-board camera of a running vehicle;
the training unit is configured to train a GAN model by utilizing the plurality of first original images to obtain an image enhancement model; wherein the GAN model comprises a discriminative model and a generative model; when the discriminative model determines that a quality of an output image of the generative model is lower than an expected quality, the generative model is trained by using the plurality of first original images to obtain the image enhancement model; and
the enhancement unit is configured to input the second original image into the image enhancement model to enhance the second original image, so as to obtain an enhanced image.

In an embodiment, when a distortion of the output image of the generative model relative to the plurality of first original images is determined by the discriminative model to be greater than a threshold, the generative model is trained by using the plurality of first original images.

In an embodiment, the discriminative model is configured to:
restore the output image through deconvolution to obtain a restored image;
compare the restored image with the plurality of first original images to determine a semantic similarity between the restored image and the plurality of first original images; and
according to the semantic similarity between the restored image and the plurality of first original images, determine the distortion of the output image relative to the plurality of first original images.

In an embodiment, the image enhancement system further comprising:
a judgment unit; and
a cleaning unit;
wherein the cleaning unit is configured to clean a surface of the camera of the running vehicle when the judgment unit determines that a quality of the second original image is lower than the expected quality.

In an embodiment, the image enhancement system further comprising:
a communication unit;
wherein the communication unit is configured to create a communication link between the running vehicle and the sampling vehicle to allow the running vehicle to acquire the plurality of first original images from the sampling vehicle.

In a third aspect, the present disclosure provides a computing device, comprising
a memory; and
a processor;
wherein the memory is configured to store one or more programs executed by the processor; and the one or more programs comprise instructions for implementing operations of:
acquiring a plurality of first original images captured by an on-board camera of a sampling vehicle;
when a discriminative model in a GAN model determines that a quality of an output image of a generative model is lower than an expected quality, training the generative model by using the plurality of first original images to obtain an image enhancement model; and
enhancing a second original image captured by an on-board camera of a running vehicle by using the image enhancement model to acquire an enhanced image.

BRIEF DESCRIPTION OF THE DRAWINGS

The additional objects, characteristics, and advantages of this application will become apparent from the following description of embodiments combined with the accompanying drawings. The accompanying drawings are used to facilitate the understanding of this application and form a part of the specification to help explain this application, and should not be understood as a limitation to this application. In the accompanying drawings, the same reference label usually represents the same part or step.

FIG. 2 is a flow chart of a method for enhancing an image according to an embodiment of the present disclosure;

DETAILED DESCRIPTION OF EMBODIMENTS

Figure 1:
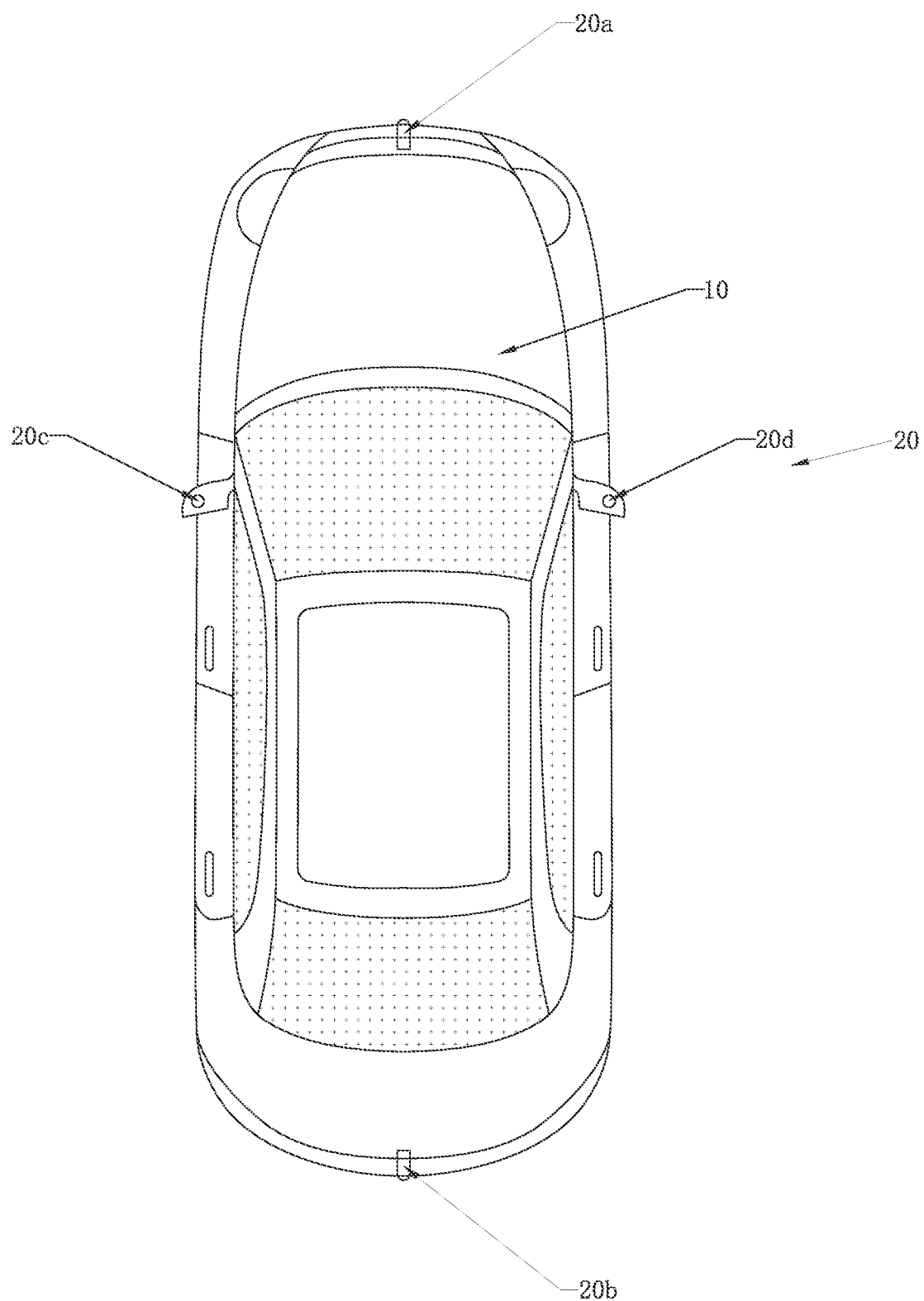
FIG. 1 is a top view of a vehicle according to an embodiment of the present disclosure.

It should be understood that the present disclosure is not limited to the configuration and arrangement described below or illustrated in the drawings. The present disclosure can have other embodiments and can be implemented in various ways. In addition, it should be understood that the wording and terminology used herein are merely descriptive and should not be considered as restriction. The terms "comprising", "including" or "having" and their variants used herein are intended to include items and equivalents thereof, and additional items recited herein. Unless otherwise specified or limited, the terms "installation", "connection", "support" and "join" and their variants used herein are generic and include both direct installation and indirect installation, connection, support and joint. In addition, "connection" and "join" are not limited to physical or mechanical connections or joins.

In addition, as used herein, directional terms, such as "longitudinal", "horizontal", "up", "down", "front", "back", "left", "right", "vertical", "horizontal", "top", "bottom", "inside", and "outside", are intended to indicate the orientation or position relationship shown in the accompanying drawings. These terms are only used to facilitate and simplify the description, and are not intended to indicate or imply that the means or elements referred to must have a specific orientation, structure, and operation in a particular orientation. Therefore, the above terms cannot be considered as a limitation to the present application. Moreover, the term "one" should be understood to be "at least one" or "one or more", namely, in one embodiment, the number of an element may be one, and in another embodiment, multiple elements are provided. Therefore, the term "one" cannot be understood as a limitation to the number of the element referred to.

FIG. 1 is a top view of a vehicle according to an embodiment of this application. The vehicle includes a main body 10 and a plurality of cameras 20. At least one of the plurality of cameras 20 is arranged at the front of the main body 10 to form a front camera 20a, which is configured to capture an image in front of the vehicle. At least one of the plurality of cameras 20 is arranged at the rear of the main body 10 to form a rear camera 20b, which is configured to capture an image in the rear of the vehicle. At least one of the plurality of cameras 20 is arranged at the left side of the main body 10 to form a left camera 20c, which is configured to capture an image in the left of the vehicle. At least one of the plurality of cameras 20 is arranged at the right side of the main body 10 to form a right camera 20d, which is configured to capture an image in the right of the vehicle.

Subsequently, images respectively captured by the front camera 20a, the rear camera 20b, the left camera 20c and the right camera 20d are merged to form a surrounding image such that the state of the surrounding environment of the vehicle can be obtained. It is understood that automatic driving can be achieved based on the images captured by the plurality of on-board cameras 20 of the vehicle. To realize the reliable and safe automatic driving of the vehicle, the images captured by the plurality of on-board camera 20 of the vehicle in this application undergo an enhancement process to improve the image quality.

The vehicle is at a running state is defined as a running vehicle of this application. At least one of the front on-board camera 20a, the rear on-board camera 20b, the left on-board camera 20c, and the right on-board camera 20d of the vehicle is capable of capturing images to render the vehicle to form a sampling vehicle of this application. In some embodiments, the running vehicle and the sampling vehicle may be the same vehicle. In some embodiments, the running vehicle and the sampling vehicle may be different vehicles.

FIG. 2 illustrates a method for enhancing an image captured by an on-board camera according to an embodiment of the present disclosure. The method provided herein is configured to enhance an image captured by an on-board camera 20 of the running vehicle to improve the image quality, and thus guaranteeing the reliability and safety of automatic driving based on the enhanced image.

In this embodiment, the method for enhancing the image includes the following steps.

(S1) A plurality of first original images captured by an on-board camera 20 of a sampling vehicle is acquired, where the first original image is unprocessed.

(S2) When a discriminative model in a generative adversarial networks (GAN) model determines that an output image of a generative model is lower than an expected quality, the generative model is trained by using the plurality of first original images to obtain an image enhancement model.

(S3) A second original image captured by an on-board camera 20 of a running vehicle is enhanced by using the image enhancement model to acquire an enhanced image, where the second original image is unprocessed.

It should be noted that in this embodiment, when the running vehicle is traveling under good lighting conditions, the second original image captured by the on-board camera 20 of the running vehicle presents a higher quality. Thus, after being inputted into the image enhancement model, the second original image does not need to be enhanced. When the running vehicle is traveling under poor-light conditions, the second original image captured by the on-board camera 20 of the running vehicle has a lower quality. Thus, after being inputted into the image enhancement model, the second original image is enhanced by the image enhancement model to obtain the enhanced image. Consequently, the quality of the enhanced image is higher than that of the second original image based on the consistent content between the enhanced image and the second original image, i.e., brightness, contrast, saturation, clarity, and smoothness. Therefore, the enhanced image is superior to the second original image to ensure the reliability and safety of automatic driving and the driving safety of the running vehicle based on the enhanced image.

In some embodiments, different sampling vehicles may pass through the same section of a road under different lighting conditions. Therefore, the on-board cameras 20 of different sampling vehicles can respectively capture the first original images of the same section of the road under different lighting conditions. For example, some of the sampling vehicles may pass through the section of the road on a clear day, so that the on-board cameras 20 of these sampling vehicles can respectively capture high-quality first original images of the section of the road. Other sampling vehicles may pass through the section of the road at night or on rainy and foggy days, so the on-board cameras 20 of these sampling vehicles can capture low-quality first original images of the section of the road.

In some embodiments, a sampling vehicle may pass through the same section of the road under different lighting conditions. Therefore, the on-board camera 20 of the sampling vehicle can respectively capture the first original images of the section of the road under different lighting conditions. For example, the sampling vehicle may pass through the section of the road on a clear day, so that the on-board camera 20 of the sampling vehicle can capture the high-quality first original image of the section of the road. Or the sampling vehicle may pass through the section of the road at night or on rainy and foggy days, so the on-board camera 20 of the sampling vehicle can capture the low-quality first original image of the section of the road.

It can be understood that in this embodiment, as the high-quality first original image is captured by the on-board camera 20 of the sampling vehicle on a clear day, the low-quality first original image is captured by the sampling vehicle at night or on rainy or foggy days, the high quality of the first original image is superior to the low-quality first original image with respect to brightness, contrast, saturation, clarity, and smoothness.

In this embodiment, step (S2) further includes the following steps.

(S21) The discriminative model in the GAN model is trained.

(S22) The generative model in the GAN model is trained by a trained discriminative model to obtain the image enhancement model.

In this embodiment, in step (S21), the discriminative model in the GAN model is trained by the high-quality first original image and the low-quality first original image to reduce a loss function of the discriminative model. More specifically, the high-quality first original image and the low-quality first original image are substituted into the loss function of the discriminant model in the GAN model to train the discriminant model by adjusting the parameters in the loss function, so as to reduce the loss function value of the discriminant model and make the discriminant model more accurate.

It can be understood that, for the trained discriminant model in the GAN model, when the high-quality first original image is inputted into the discriminant model, the probability that the first original image outputted by the discriminant model is the high-quality first original image tends to approach 100%. Correspondingly, when the low-quality first original image is inputted into the discriminant model, the probability that the first original image outputted by the discriminant model is the high-quality first original image tends to approach 0%.

Notably, when the high-quality first original image is inputted into the discriminant model, the probability that the first original image outputted by the discriminant model is the high-quality first original image is closer to 100%, and when the low-quality first original image is inputted into the discriminant model, the probability that the first original image outputted by the discriminant model is the high-quality first original image is closer to approach 0%, the discriminant model in the GAN model is more accurate.

In step (S22), the generative model in the GAN model is trained by a low-quality first original image by using a trained discriminative model. Specifically, firstly, the low-quality first original image is inputted into the generative model in the GAN model to allow the generative model to output an output image. Then, the output image is inputted into the discriminative model in the GAN model to allow the discriminative model to obtain the loss function of the generative model by discriminating the outputted image. The smaller the loss function of the generative model is, the higher the quality of the output image of the generative model is. The greater the loss function of the generative model is, the poor the quality of the output image outputted by the generative model is.

In this embodiment, in step (S2), when the distortion of the output image of the generative model relative to the first original image is discriminated by the discriminative model in the GAN model to be greater than the threshold, the generative model is trained by using the plurality of first original images to reduce the loss function of the generative model. Notably, the threshold of distortion is preset as required.

Specifically, the output image of the generative model output is restored through deconvolution to obtain a restored image. Then, the semantic similarity of the restored image and the first original image is compared. At last, according to the semantic similarity between the restored image and the first original image, the distortion of the output image relative to the first original image is determined.

Figure 4:
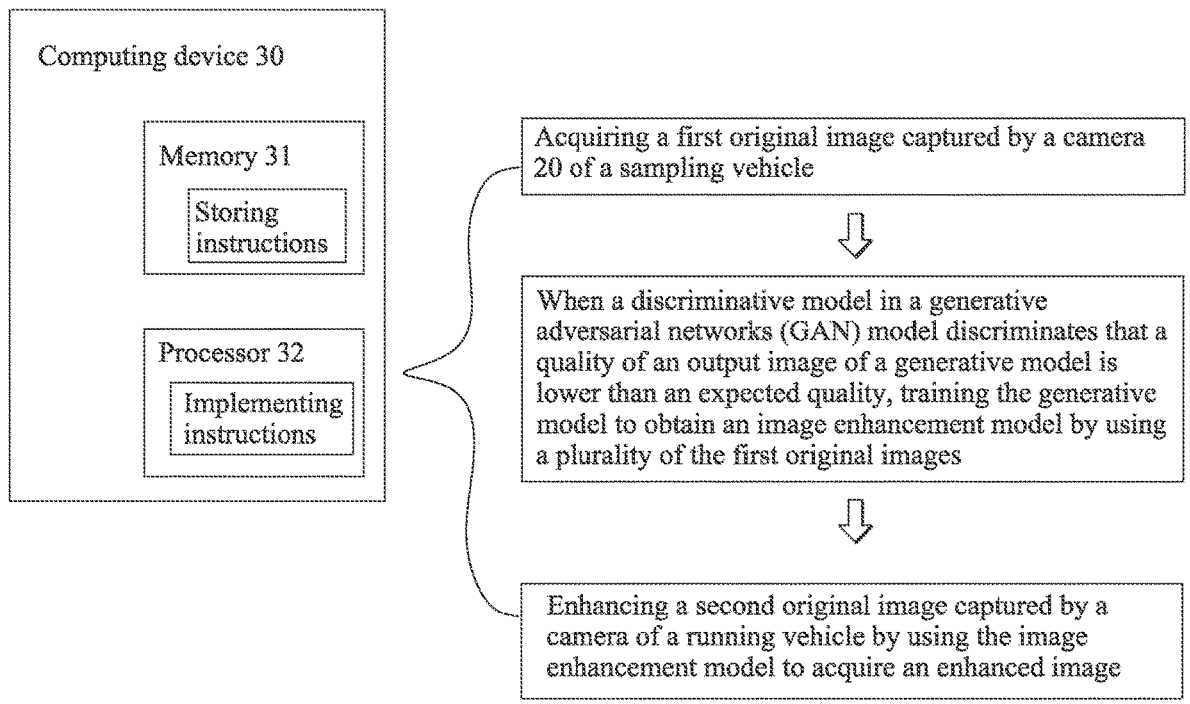
FIG. 4 is a block diagram of a computing device according to an embodiment of the present disclosure.
Figure 5:
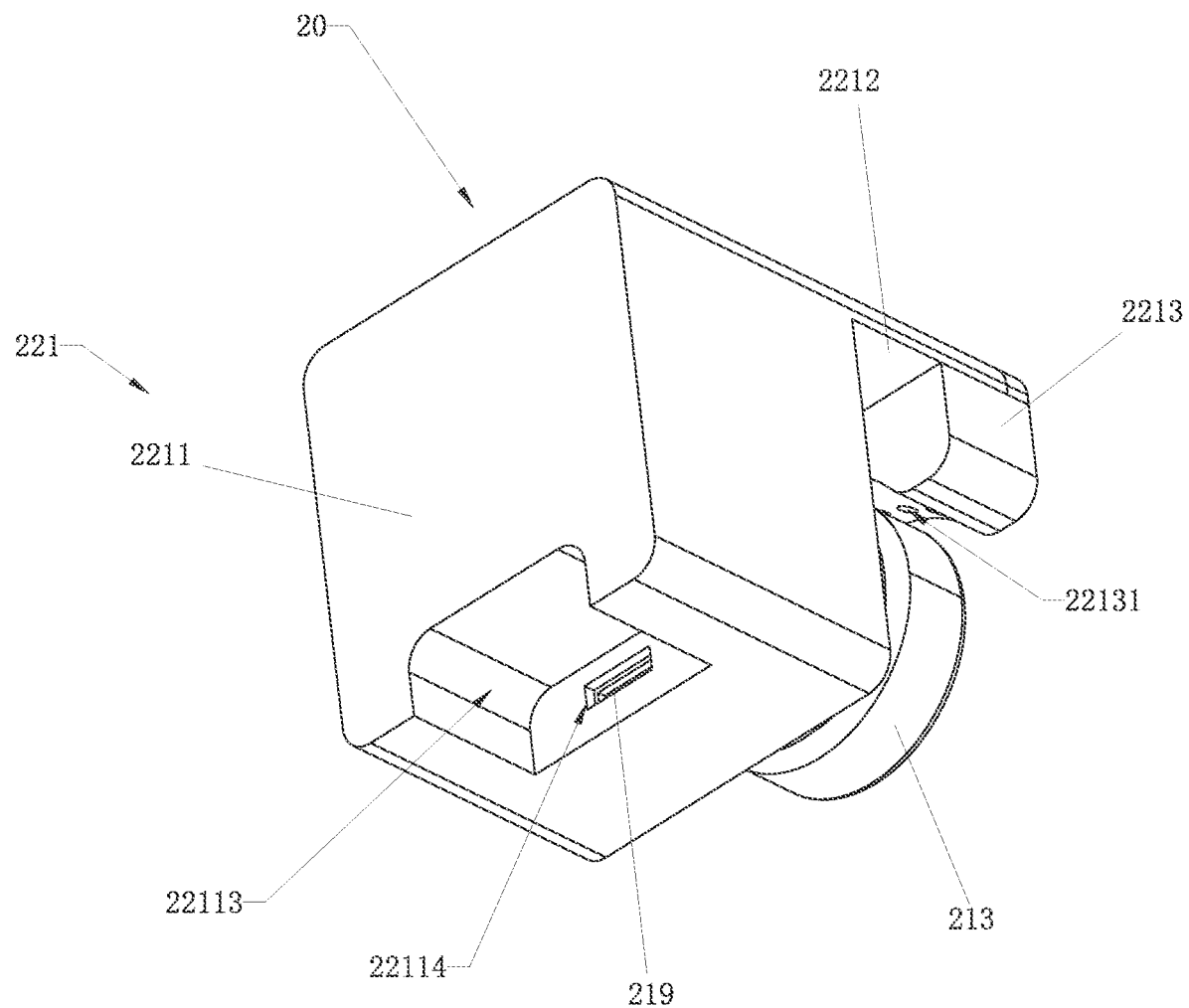
FIGS. 5 and 6 show two perspective views of an on-board camera of the vehicle according to an embodiment of the present disclosure.
Figure 6:
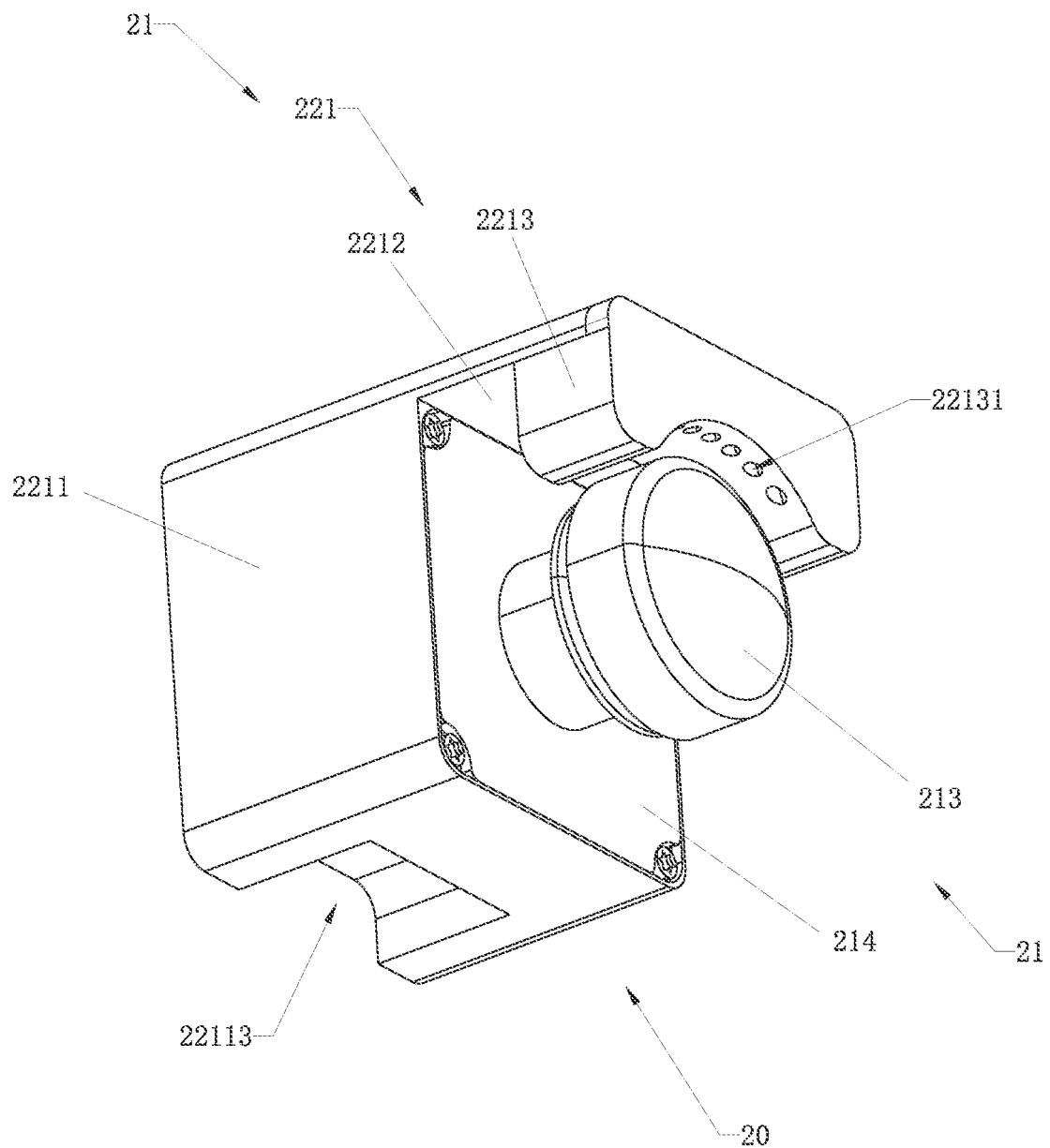
Figure 7:
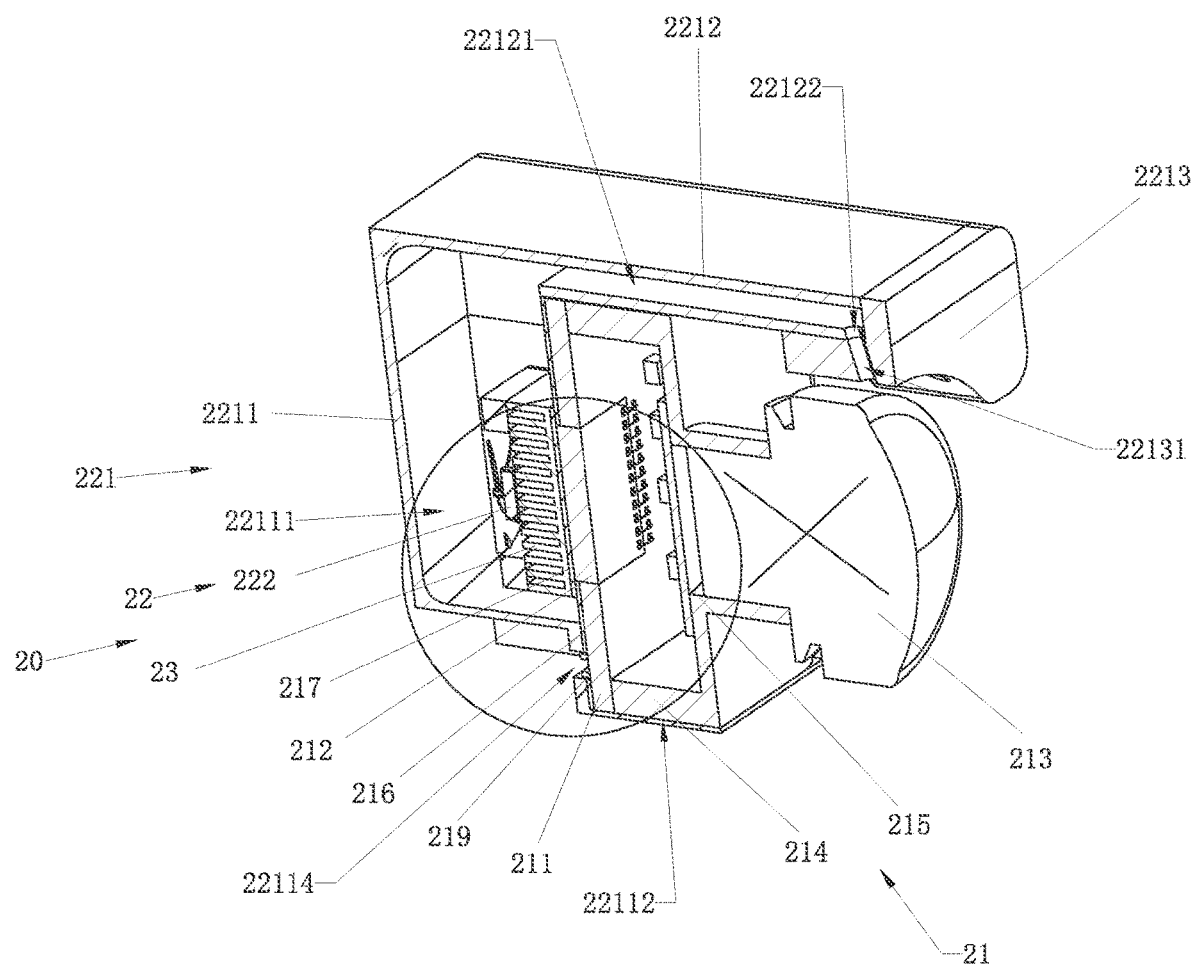
FIG. 7 is a sectional view of the on-board camera according to an embodiment of the present disclosure.
Figure 8:
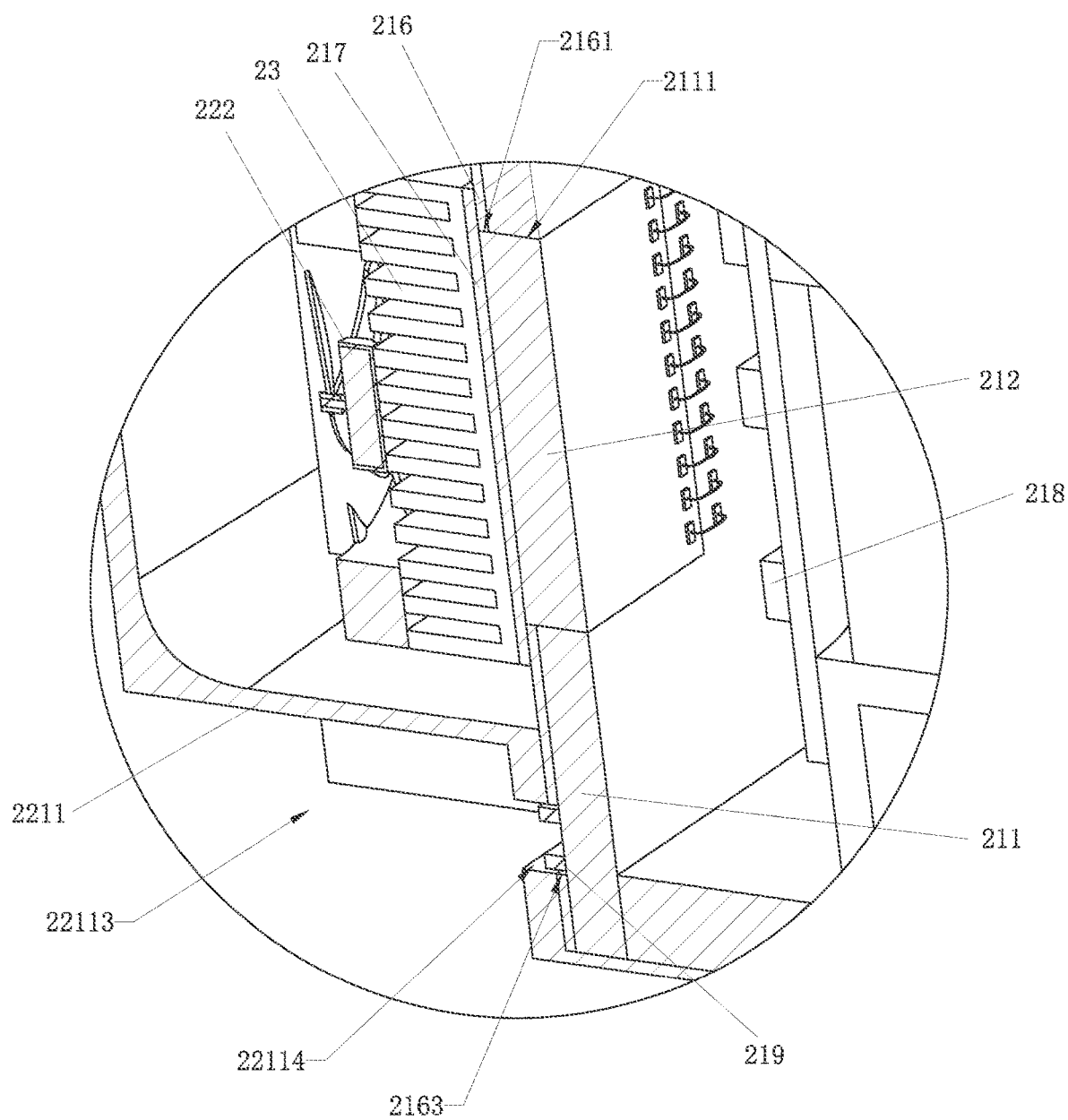
FIG. 8 is a partial enlargement view of FIG. 7.
Figure 9:
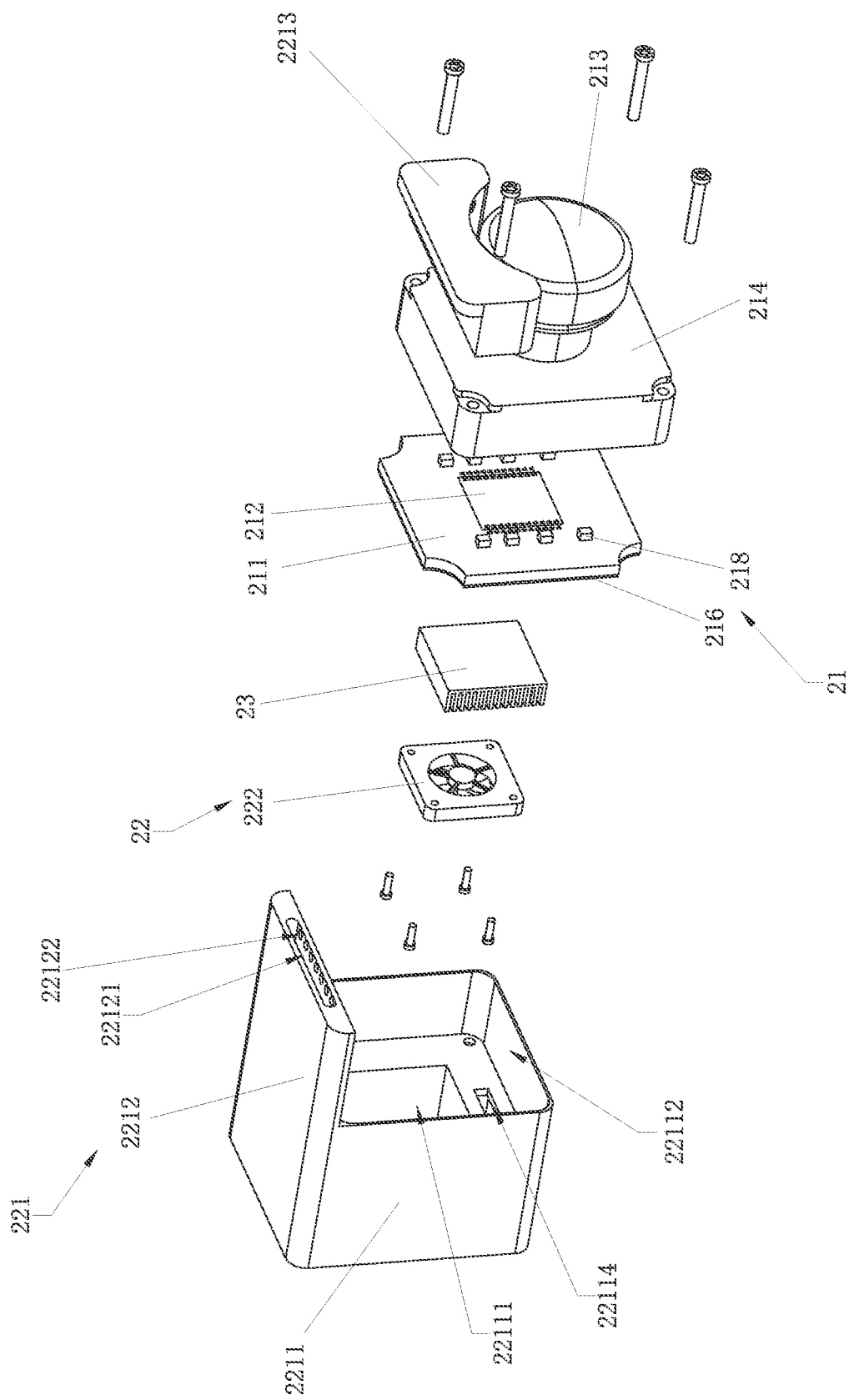
FIGS. 9-10 show two perspective exploded views of the on-board camera according to an embodiment of the present disclosure.
Figure 10:
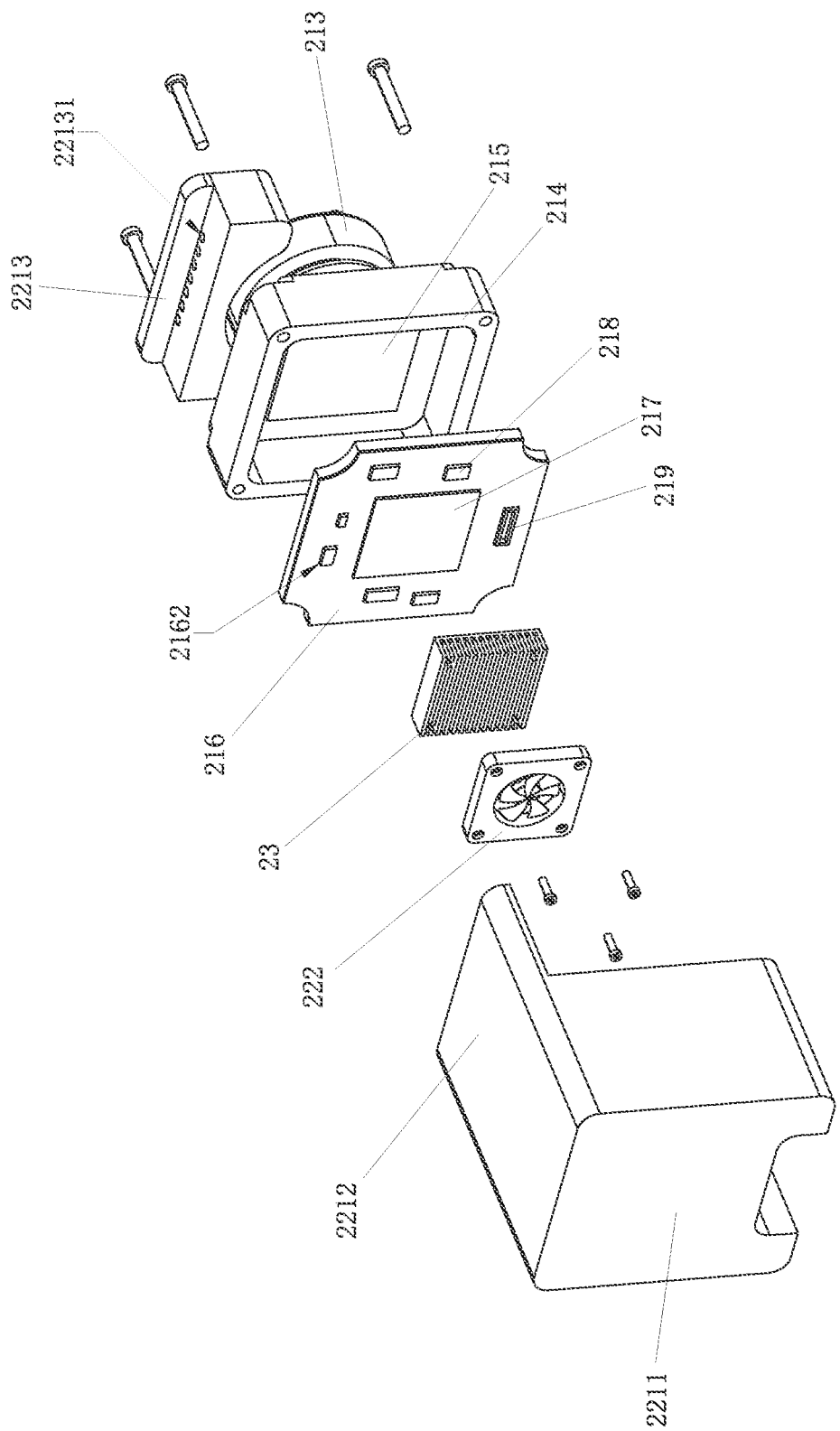

Referring to FIG. 4, a computing device 30 is provided in the main body 10 of the vehicle according to an embodiment of this disclosure, which may be but is not limited to an on-board computer. The computing device 30 further includes a memory 31 and a processor 32. The memory 31 may include a hard disk or a USB flash disk and is configured to store instructions. The processor 32 may be but is not limited to a central processor, and is configured to execute the instructions stored in the memory 31 to perform the following operations: (S1) the plurality of of first original images captured by the on-board camera 20 of the sampling vehicle are acquired, where the first original image is unprocessed; (S2) when the discriminative model in the GAN model determines that a quality of the output image of the generative model is lower than an expected quality, the generative model is trained by using the plurality of first original images to obtain an image enhancement model; and (S3) a second original image captured by the on-board camera 20 of the running vehicle is enhanced by using the image enhancement model to acquire an enhanced image.

In an embodiment, the plurality of first original images are sampled by different sampling vehicles, and these sampling vehicles are not the same as the running vehicle. To allow for description, the first original image captured by the on-board camera 20 of the first sampling vehicle is defined as a high-quality first original image, which is then uploaded with its position information to the cloud. It can be understood that the position information of the high-quality first original image is generated by a positioning module (such as the Global Positioning System (GPS)) of the first sampling vehicle or an electronic device carried by a person in the first sampling vehicle. The first original image captured by the on-board camera 20 of the second sampling vehicle is defined as a low-quality first original image, which is then uploaded with its position information to the cloud. It can be understood that the position information of the low-quality first original image is generated by a positioning module (such as GPS) of the second sampling vehicle or an electronic device carried by a person in the second sampling vehicle. When the running vehicle travels to the same section of the road as the first sampling vehicle and the second sampling vehicle under poor-lighting conditions, a communication link is respectively created between the running vehicle and the first sampling vehicle, and between the running vehicle and the second sampling vehicle to allow the running vehicle to obtain a high-quality first original image from the on-board camera 20 of the first sampling vehicle and a low-quality first original image from the on-board camera 20 of the second sampling vehicle 20. For instance, the running vehicle can respectively communicate with the first sampling vehicle and the second sampling vehicle through the cloud. Certainly, the communication respectively created between the running vehicle and the first sampling vehicle, and between the running vehicle and the second sampling vehicle can be real-time or non-real-time, and there is no restriction herein. When the processor 32 of the computing device 30 of the running vehicle executes the instructions stored in the memory 31, the discriminative model in the GAN model is trained by using the high-quality first original image and the low-quality first original image, and the generative model in the GAN model is trained by using the low-quality first original image to obtain the image enhancement model. After the low-quality second original image captured by the on-board camera 20 of the running vehicle is inputted into the image enhancement model, the image enhancement model can enhance the second original image and then output the enhanced image. The enhanced image is obtained by enhancing the second original image with the image enhancement model.

In an embodiment, the GAN model is trained in the cloud. Specifically, after the high-quality first original image captured by the on-board camera 20 of the first sampling vehicle, the position information of the high-quality first original image, the low-quality first original image captured by the on-board camera 20 of the second sampling vehicle, and the position information of the low-quality first original image are uploaded to the cloud, the GAN model is trained by the high-quality first original image and the low-quality first original image. When the running vehicle travels to the same section of the road as the first sampling vehicle and the second sampling vehicle in poor-lighting conditions, the second original image captured by the on-board camera 20 of the running vehicle can be uploaded to the cloud, and then is trained by the image enhancement in the cloud to output the enhanced image. The enhanced image can subsequently be downloaded to the running vehicle.

In an embodiment, when the running vehicle travels in good-lighting conditions, the on-board camera 20 of the running vehicle can capture the high-quality first original image, which can be uploaded with its position information to the cloud or stored in the memory 31 of the computing device 30. When the running vehicle travels in poor-lighting conditions, the on-board camera 20 of the running vehicle can capture the low-quality first original image, which can be uploaded with its position information to the cloud or stored in the memory 31 of the computing device 30. When the processor 32 of the computing device 30 of the running vehicle executes the instructions stored in the memory 31, the discriminative model in the GAN model is trained by using the high-quality first original image and the low-quality first original image, and the generative model in the GAN model is trained by using the low-quality first original image to obtain the image enhancement model. After the low-quality second original image captured by the on-board camera 20 of the running vehicle is inputted into the image enhancement model, the image enhancement model can enhance the second original image and output the enhanced image. The enhanced image is obtained by enhancing the second original image with the image enhancement model.

Figure 3:
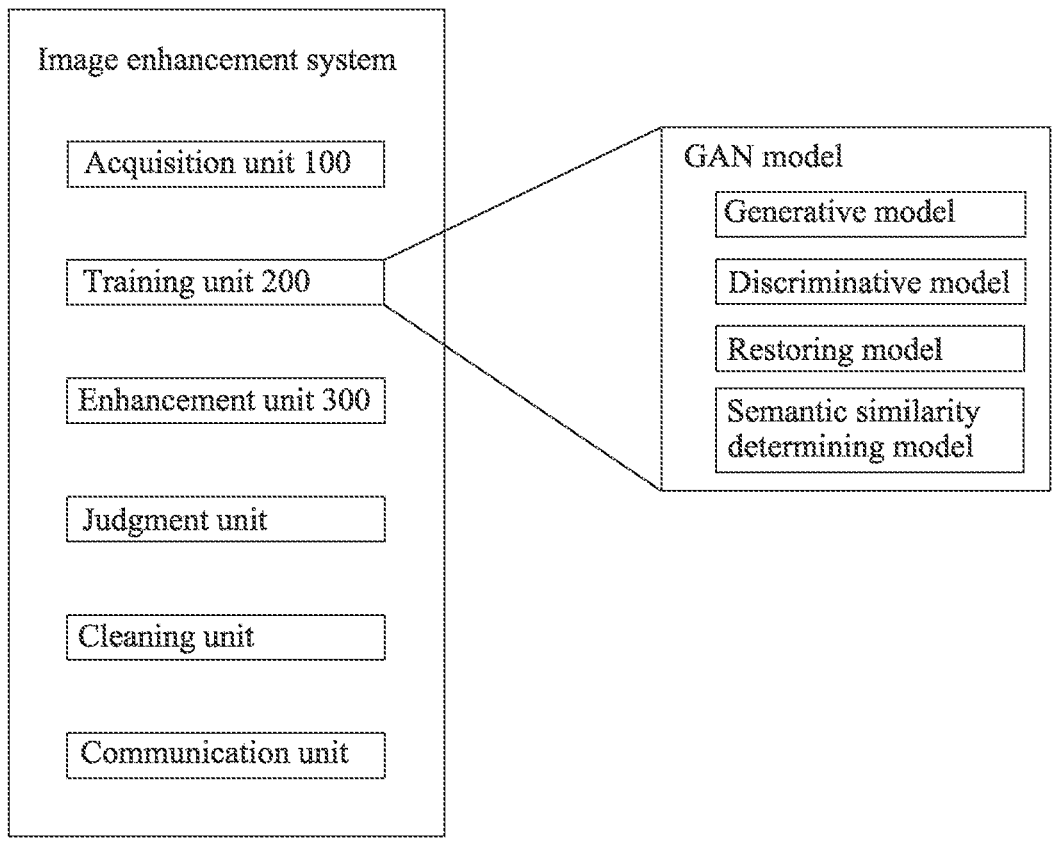
FIG. 3 is a block diagram of a system for enhancing the image according to an embodiment of the present disclosure.

Referring to FIG. 3, an image enhancement system is provided according to an embodiment of this disclosure, which is configured to enhance the image captured by the on-board camera 20 of the running vehicle, so as to improve the image quality and thus guarantee the reliability and safety of automatic driving based on the enhanced image. Specifically, the image enhancement system includes an acquisition unit 100, a training unit 200 and an enhancement unit 300.

The acquisition unit 100 is configured to acquire the first original image captured by the on-board camera 20 of the sampling vehicle and the second original image captured by the on-board camera 20 of the running vehicle. For example, in some embodiments, the high-quality first original image captured by the on-board camera 20 of the first sampling vehicle, the low-quality first original image captured by the on-board camera 20 of the second sampling vehicle, and the second original image captured by the on-board camera 20 of the running vehicle can be acquired by the acquisition unit 100. In other embodiments, the high-quality first original image and its position information, the low-quality first original image and its position information, and the second original image and its position information can be acquired by the acquisition unit 100.

The training unit 200 is configured to train the GAN model to obtain the image enhancement model by utilizing a plurality of the first original images. Specifically, firstly, the training unit 200 trains the discriminative model in the GAN model by using the high-quality first original image and the low-quality first original image to reduce the loss function of the discriminant model to make the discriminative model more accurate. Secondly, the training unit 200 trains the generative model in the GAN model through the low-quality first original image by using the trained discriminative model to obtain the image enhancement model.

In an embodiment, when the distortion of the output image of the generative model relative to the first original image is discriminated by the discriminative model in the GAN model to be greater than the threshold, the generative model is trained by using a plurality of the first original images to reduce the loss function of the generative model. In this way, the obtained generative model is more accurate, which can improve the enhancement effect of the image enhancement model.

In an embodiment, the output image of the generative model output is restored through deconvolution to obtain a restored image. Then, the semantic similarity of the restored image and the first original image is compared. At last, according to the semantic similarity between the restored image and the first original image, the distortion of the output image relative to the first original image is determined. If the distortion of the output image of the generative model relative to the first original image is discriminated by the discriminative model to be greater than the threshold, the generative model in the GAN model is trained by using the low-quality first original images. If the distortion of the output image of the generative model relative to the first original image is discriminated by the discriminative model to be smaller than the threshold, the generative model is trained completely. It can be understood that by controlling the distortion threshold, the enhancement effect of the image enhancement model can be improved.

The enhancement unit 300 is configured to input the second original image into the image enhancement model to obtain the enhanced image, so as to improve imaging of the running vehicle, facilitating the automatic driving of the running vehicle.

Referring to FIG. 3, the image enhancement system according to an embodiment further includes a judgment unit 400 and a cleaning unit 500, where the judgment unit 400 is configured to judge the quality of the second original image, if the judgment unit 400 determines that the quality of the second original image is lower than the preset quality, the cleaning unit 500 is configured to clean the surface of the on-board camera 20 of the running vehicle. For example, in an embodiment, when the running vehicle is driving on a rainy and foggy day, the surface of the on-board camera 20 of the running vehicle may be attached with water mist, which affects the imaging effect of the on-board camera 20, thereby affecting the quality of the second original image. The judgment unit 400 may analyze the second original image captured by the on-board camera 20 to determine whether the surface of the on-board camera 20 is attached with the water mist. For example, by comparing the images captured at different periods, the judgment unit 400 determines whether the surface of the on-board camera 20 is attached with the water mist, if the judgment unit 400 determines that the surface of the on-board camera 20 is attached with the water mist, the cleaning unit 500 is configured to clean the surface of the on-board camera 20, so as to remove the water mist attached to the surface of the on-board camera 20, thereby improving the quality of the second original image.

In an embodiment, the judgment unit 400 determines that the surface of the on-board camera 20 is attached with the water mist, and the cleaning unit 500 may clean the surface of the on-board camera 20 by blowing air. Preferably, the cleaning unit 500 blows air to the surface of the on-board camera 20 from top to bottom to improve the cleaning effect.

FIGS. 5-10 illustrate the specific structure of the on-board camera 20 of the vehicle, where the on-board camera 20 includes a camera device 21 and a cleaning device 22. The camera device 21 and the cleaning device 22 are integrated to form an integrated camera. In this way, on the one hand, the cleaning device 22 can clean the dust, mist, and water droplets attached to the surface of the camera device 21 to improve the image quality captured by the on-board camera 20, such as the image quality of the first original image captured by the on-board camera 20 of the sampling vehicle and the second original image captured by the on-board camera 20 of the running vehicle. On the other hand, the integration of the cleaning device 22 and the camera device 21 can improve the response speed of the cleaning device 22, facilitating to timely clean the dust, fog, and water droplets on the surface of the camera device 21, which is particularly effective for automatic driving or safe driving of the running vehicles when traveling at high speeds.

Specifically, the camera device 21 includes a circuit board 211, an image sensor 212, a lens 213, and a mirror holder 214. The image sensor 212 is electrically connected to the circuit board 211, the mirror holder 214 is mounted on the circuit board 211, the lens 213 is assembled in the mirror holder 214, and the mirror holder 214 is configured to maintain the lens 213 in a photosensitive path of the image sensor 212 such that the external light can pass through the lens 212 to reach the image sensor 212 for imaging. Preferably, the lens 213 is wide-angle to allow the camera device 21 to have a greater field of view. Preferably, the camera device 21 further includes a light filter 215, which is assembled in the lens holder 214 and located between the lens 213 and the image sensor 212, and is configured to filter a particular type of light passing through the lens 213. For example, the light filter 215 is an infrared cut filter.

Typically, the circuit board 211 is a PCB circuit board, which has a higher hardness and flatness. Or the circuit board 211 is an FPC circuit board, which has a thinner thickness. The image sensor 212 may be electrically connected to the circuit board 211 by a gold wire. To further reinforce the hardness and flatness of the circuit board 211, the camera device 21 further includes a steel plate 216. The steel plate 216 is mounted on the back of the circuit board 211, namely, the steel plate 216 is mounted on the side of the circuit board 211 away from the lens 213.

In an embodiment, the camera device 21 further includes a refrigeration chip 217, where the image sensor 212 is mounted in the middle of the cold side of the refrigeration chip 217. The circuit board 211 has a circuit board center perforation 2111, the steel plate 216 has a steel plate center perforation 2161, and the steel plate center perforation 2161 corresponds to and communicates to the circuit board center perforation 2111. The edge of the cold side of the refrigeration chip 217 is mounted on the steel plate 216 such that the hot side of the refrigeration chip 217 is away from the steel plate 216, and the image sensor 212 is maintained in the steel plate center perforation 2161 and the circuit board center perforation 2111. Through the above structure, on the one hand, the cold side of the refrigeration chip 217 is made of a ceramic material, which has a higher flatness, while the steel plate 216 also has a higher flatness. In this way, after the image sensor 212 is mounted on the middle of the cold side of the refrigeration chip 217 and the edge of the cold side of the refrigeration chip 217 is mounted on the steel plate 216, the flatness of the image sensor 212 can be guaranteed to ensure that the camera device 21 has a preferred imaging effect. On the other hand, the image sensor 212 is directly mounted on the refrigeration chip 217 such that the heat generated by the image sensor 212 during the photoelectric conversion can be directly absorbed by the refrigeration chip 217 such that the image sensor 212 can maintain a lower operating temperature for a long time, thereby ensuring the stability of the camera device 21 during operation.

Preferably, the photosensitive surface of the image sensor 212 is flush with the front of the circuit board 211, or the photosensitive surface of the image sensor 212 is convex from the front of the circuit board 211, facilitating to reduce the stray light and ensuring the imaging quality such that the camera 20 of the sampling vehicle can capture a high-quality first original image and the camera 20 of the running vehicle can capture a high-quality second original image.

In an embodiment, the camera device 21 further includes a plurality of electronic components 218, which are mounted on the surface of the circuit board 211. The plurality of electronic components 218 may be resistors, capacitors, processors, controllers, etc., to form a logic circuit, thereby controlling the operating state of the image sensor 212 and the refrigeration chip 217 both electrically connected to the circuit board 211. Preferably, a portion of the plurality of electronic components 218 may be mounted on the front of the circuit board 211, and the other portion of the plurality of electronic components 218 may be mounted on the back of the circuit board 211. In this way, such a small area of the circuit board 211 can be integrated with more of the plurality of electronic components 218, facilitating to improve the overall performance of the camera device 21. The steel plate 216 may be provided with a plurality of first avoidance holes 2162 to avoid the portion of the plurality of electronic components 218 mounted on the back of the circuit board 211. In other words, the plurality of first avoidance holes 2162 of the steel plate 216 are configured to accommodate the portion of the plurality of electronic components 218 mounted on the back of the circuit board 211.

In an embodiment, the camera device 21 further includes a connector 219. The connector 219 is mounted on the back of the circuit board 211 and is configured to connect to the main body 10 of the vehicle. The steel plate 216 has a second avoidance hole 2163 to avoid the connector 219 mounted on the back of the circuit board 211. In other words, the second avoidance hole 2163 of the steel plate 216 is configured to accommodate the connector 219 mounted on the back of the circuit board 211.

Referring to FIGS. 5-10, the cleaning device 22 includes a cleaning housing 221 and a fan 222. The clean housing 221 includes a shell body 2211 and an extension arm 2211 integrally extending outward from the shell body 2211, where the shell body 2211 has an airflow generation space 22111 and an opening 22112 communicated with the airflow generation space 22111. The camera device 21 is arranged the opening 22112 of the shell body 22112 with the lens 213 facing outwards, and seals the opening 22112 of the shell body 2211. The fan 222 is suspended in the airflow generation space 22111 of the shell body 2211, and corresponds to the refrigeration chip 217 of the camera device 21. The extension arm 2212 is provided with a gas flow channel 22121 and at least one air outlet 22122 communicated with the airflow channel. The airflow channel 22121 is communicated with the airflow generation space 22111, and the at least one air outlet 22122 is opposite the lens 213. Preferably, the fan 222 is electrically connected to the circuit board 211 of the camera device 21.

When the fan 222 is energized and rotated, the fan 222 is capable of generating airflow in the airflow generation space 22111 of the shell body 2211, and the airflow flows through the airflow channel 22121 of the extension arm 2212 and is discharged through the air outlet 22122 of the extension arm 2212 to blow to the lens 213 to remove the dust, fog, and water droplets attached to the surface of the lens 213, and thus improving the image quality captured by the plurality of cameras 20. Since the size of the air outlet 22122 of the extension arm 2212 is smaller than that of the airflow channel 22121, when the airflow is discharged from the airflow channel 22122 through the air outlet 22122 of the extension arm 22122, the airflow can be accelerated to form a high-speed airflow to improve the effect of blowing off dust, fog, and water droplets attached to the surface of the lens 213.

In an embodiment, when the camera 20 is arranged on the main body 10 of the vehicle, the extension arm 2212 of the cleaning housing 221 of the cleaning device 20 of the cleaning device 221 of the camera 20 is located above the lens 213 of the camera device 21 such that the airflow can be blown to the lens 213 from top to bottom, so as to improve the effect of blowing off dust, mist, and water droplets attached to the surface of the lens 213.

Referring to FIGS. 5-10, the cleaning housing 221 further includes a guiding portion 2213. The guiding portion 2213 is provided with at least one guiding channel 22131, and is arranged at the end of the extension arm 2212. The guiding channel 2213 of the guiding portion 2213 is communicated with the extension arm 2212 of the air outlet 2212. The guiding portion 2213 of the guiding channel 22131 is oppositely adjacent to the surface of the lens 213 of the camera device 21 to guide the airflow from the air outlet 22122 of the extension arm 2212 to the surface of the lens 213.

Notably, there are no restrictions herein regarding the arrangement manner of the guiding portion 2213 at the end of the extension arm 2212. For instance, the guiding portion 2213 may be locked by screws at the end of the extension arm 2212, or bonded to the end of the extension arm 2212 by glue.

The lens 213 of the camera 20 is wide-angle, the outside of which is convex outwards. To further improve the effect of blowing off dust, fog, and water droplets attached to the surface of the lens 213, the guidance channel 22131 of the guide portion 2213 extends obliquely.

Preferably, the shell body 2211 of the cleaning housing 221 is provided with a notch 22113 and a docking channel 2214. The notch 22113 is formed by the shell body 2211 in a lateral concave manner, and the docking channel 2214 is communicated with the airflow generation space 22111 and the notch 22213. The connector 219 of the camera device 21 extends to the docking channel 2214 of the shell body 2211 such that the integrated camera 20 can be convenient to install on the main body 10 of the vehicle, and the sealing effect of the camera 20 can be enhanced.

Referring to FIGS. 5-10, the camera 20 in an embodiment further includes a thermal conduction device 23, which is mounted on the heat side of the refrigeration chip 217, and the fan 222 is mounted on the thermal conductive device 23. As a consequence, after the camera device 21 is mounted at the opening 22112 of the shell body 2211, the fan 222 can be suspended in the airflow generation space 22111 of the shell body 2211. Moreover, the thermal conduction device 23 is capable of quickly radiating the heat generated by the image sensor 212 during operation to the airflow generating space 22111 of the shell body 2211 to make the airflow at a higher temperature. In this manner, when the airflow passes through the air outlet 22122 of the extension arm 2212 and the guiding portion 2213 of the guiding channel 2213 to blow to the lens 213, it can not only blow off the dust, mist, and water droplets attached to the surface of the lens 213, but also quickly dry the surface of the lens 213 to improve the cleaning effect.

In this application, the camera 20 may utilize the heat generated by the image sensor 21 to form a higher temperature airflow at work, therefore, the camera 20 is not needed to be provided with a special heat source to form a higher temperature airflow, which blows to the surface of the lens 213 of the camera device 21, and thus simplifying the overall structure of the camera 20 and improving the reliability of the camera 20.

It should be understood by those skilled in the art that the above embodiments are only some embodiments of the present application, the features of different embodiments may be combined to obtain other embodiments that are easily conceivable according to what is disclosed according to the present application but are not indicated in the drawings.

It should be understood that these embodiments are merely exemplary and are not intended to limit this application. The functional and structural principles of the present application have been shown and illustrated in these embodiments. It should be noted that various modifications and changes made by those skilled in the art without departing from the spirit and scope of the disclosure shall fall within the scope of the disclosure defined by the appended claims.

What is claimed is:

1. A method for enhancing an image captured by an on-board camera, comprising:
    (a) acquiring a plurality of first original images captured by an on-board camera of a sampling vehicle;
    (b) when a discriminative model in a generative adversarial networks (GAN) model determines that a quality of an output image of a generative model is lower than an expected quality, training the generative model by using the plurality of first original images to obtain an image enhancement model; and
    (c) enhancing, by using the image enhancement model, a second original image captured by an on-board camera of a running vehicle to acquire an enhanced image,
    where the on-board camera includes a camera device, the camera device includes a circuit board, an image sensor, a lens, a mirror holder, a steel plate, and a refrigeration chip, the circuit board has a circuit board center perforation, the steel plate has a steel plate center perforation, and the steel plate is mounted on the back of the circuit board, and the steel plate center perforation corresponds to and communicates to the circuit board center perforation, the edge of the cold side of the refrigeration chip is mounted on the steel plate, and the image sensor is maintained in the steel plate center perforation and the circuit board center perforation, the image sensor is electrically connected to the circuit board, the mirror holder is mounted on the circuit board, the lens is assembled in the mirror holder, and the mirror holder is configured to maintain the lens in a photosensitive path of the image sensor.

2. The method of claim 1, wherein in step (b), when a distortion of the output image of the generative model relative to the plurality of first original images is determined by the discriminative model to be greater than a threshold, the generative model is trained by using the plurality of first original images.

3. The method of claim 1, wherein step (b) further comprises:

(b.1) restoring the output image through deconvolution to obtain a restored image;
(b.2) comparing the restored image with the plurality of first original images to determine a semantic similarity between the restored image and the plurality of first original images; and
(b.3) according to the semantic similarity between the restored image and the first original image, determining a distortion of the output image relative to the plurality of first original images.

4. The method of claim 1, wherein the running vehicle in step (c) is the sampling vehicle in step (a).

5. The method of claim 1, wherein the running vehicle in step (c) is different from the sampling vehicle in step (a).

6. The method of claim 5, wherein in step (a), when the running vehicle travels near to the sampling vehicle, a communication link between the running vehicle and the sampling vehicle is created to allow the running vehicle to acquire the plurality of first original images from the sampling vehicle.

7. The method of claim 1, wherein the plurality of first original images are captured by the sampling vehicle under a poor-lighting condition; and the second original image is captured by the running vehicle during running.

8. The method of claim 1, wherein step (c) further comprises:
determining a quality of the second original image; and
when the quality of the second original image is lower than the expected quality, cleaning a surface of the on-board camera of the running vehicle.

9. The method of claim 8, wherein the surface of the on-board camera of the running vehicle is cleaned by air blowing from top to bottom.

10. An image enhancement system, comprising:
an acquisition unit;
a training unit; and
an enhancement unit;
wherein the acquisition unit is configured to acquire a plurality of first original images captured by an on-board camera of a sampling vehicle and a second original image captured by an on-board camera of a running vehicle;
the training unit is configured to train a GAN model by utilizing the plurality of first original images to obtain an image enhancement model; wherein the GAN model comprises a discriminative model and a generative model; when the discriminative model determines that a quality of an output image of the generative model is lower than an expected quality, the generative model is trained by using the plurality of first original images to obtain the image enhancement model; and
the enhancement unit is configured to input the second original image into the image enhancement model to enhance the second original image, so as to obtain an enhanced image,
where the on-board camera includes a camera device, the camera device includes a circuit board, an image sensor, a lens, a mirror holder, a steel plate, and a refrigeration chip, the circuit board has a circuit board center perforation, the steel plate has a steel plate center perforation, and the steel plate is mounted on the back of the circuit board, and the steel plate center perforation corresponds to and communicates to the circuit board center perforation, the edge of the cold side of the refrigeration chip is mounted on the steel plate, and the image sensor is maintained in the steel plate center perforation and the circuit board center perforation, the image sensor is electrically connected to the circuit board, the mirror holder is mounted on the circuit board, the lens is assembled in the mirror holder, and the mirror holder is configured to maintain the lens in a photosensitive path of the image sensor.

11. The image enhancement system of claim 10, wherein when a distortion of the output image of the generative model relative to the plurality of first original images is determined by the discriminative model to be greater than a threshold, the generative model is trained by using the plurality of first original images.

12. The image enhancement system of claim 11, wherein the discriminative model is configured to:
restore the output image through deconvolution to obtain a restored image;
compare the restored image with the plurality of first original images to determine a semantic similarity between the restored image and the plurality of first original images; and
according to the semantic similarity between the restored image and the plurality of first original images, determine the distortion of the output image relative to the plurality of first original images.

13. The image enhancement system of claim 10, further comprising:
a judgment unit; and
a cleaning unit;
wherein the cleaning unit is configured to clean a surface of the on-board camera of the running vehicle when the judgment unit determines that a quality of the second original image is lower than the expected quality.

14. The image enhancement system of claim 10, further comprising:
a communication unit;
wherein the communication unit is configured to create a communication link between the running vehicle and the sampling vehicle to allow the running vehicle to acquire the plurality of first original images from the sampling vehicle.

15. A computing device, comprising
a memory; and
a processor;
wherein the memory is configured to store one or more programs executed by the processor; and the one or more programs comprise instructions for implementing operations of:
acquiring a plurality of first original images captured by an on-board camera of a sampling vehicle;
when a discriminative model in a GAN model determines that a quality of an output image of a generative model is lower than an expected quality, training the generative model by using the plurality of first original images to obtain an image enhancement model; and
enhancing a second original image captured by an on-board camera of a running vehicle by using the image enhancement model to acquire an enhanced image,
where the on-board camera includes a camera device, the camera device includes a circuit board, an image sensor, a lens, a mirror holder, a steel plate, and a refrigeration chip, the circuit board has a circuit board center perforation, the steel plate has a steel plate center perforation, and the steel plate is mounted on the back of the circuit board, and the steel plate center perforation corresponds to and communicates to the circuit board center perforation, the edge of the cold side of the refrigeration chip is mounted on the steel plate, and the image sensor is maintained in the steel plate center perforation and the circuit board center perforation, the image sensor is electrically connected to the circuit board, the mirror holder is mounted on the circuit board, the lens is assembled in the mirror holder, and the mirror holder is configured to maintain the lens in a photosensitive path of the image sensor.

* * * * *